(No Model.) 2 Sheets—Sheet 2.
A. C. BUTTS & J. O'MARRA.
CART.
No. 495,722. Patented Apr. 18, 1893.
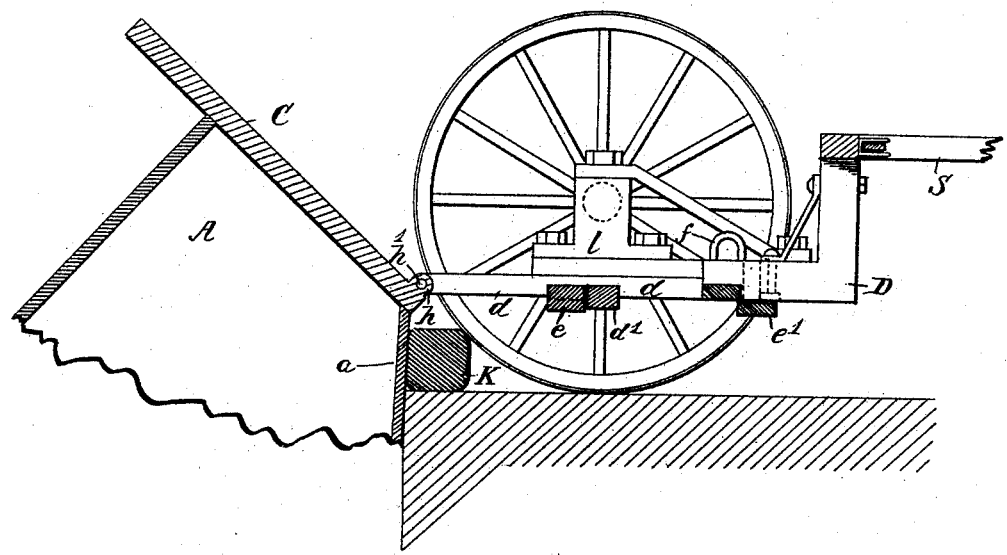
Fig. 3.
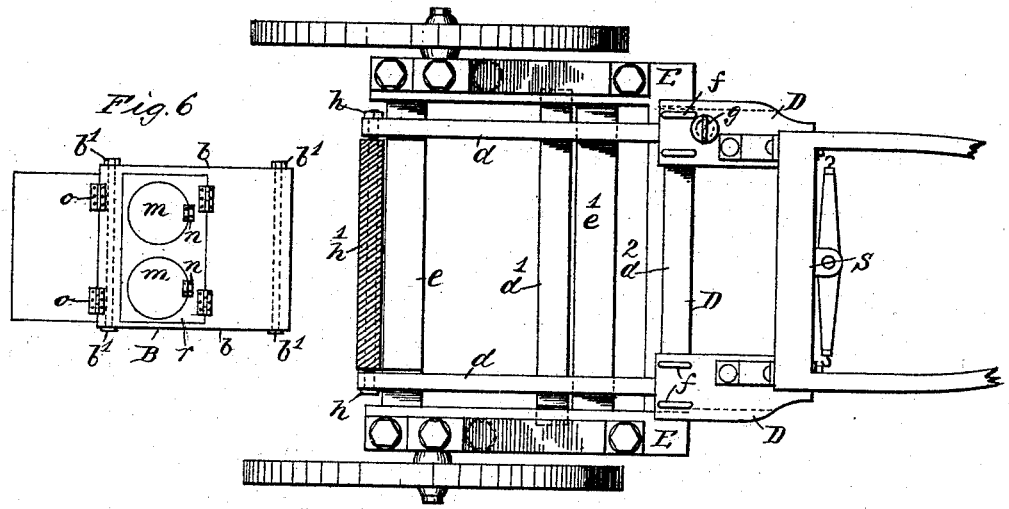
Fig. 4.
Fig. 6.

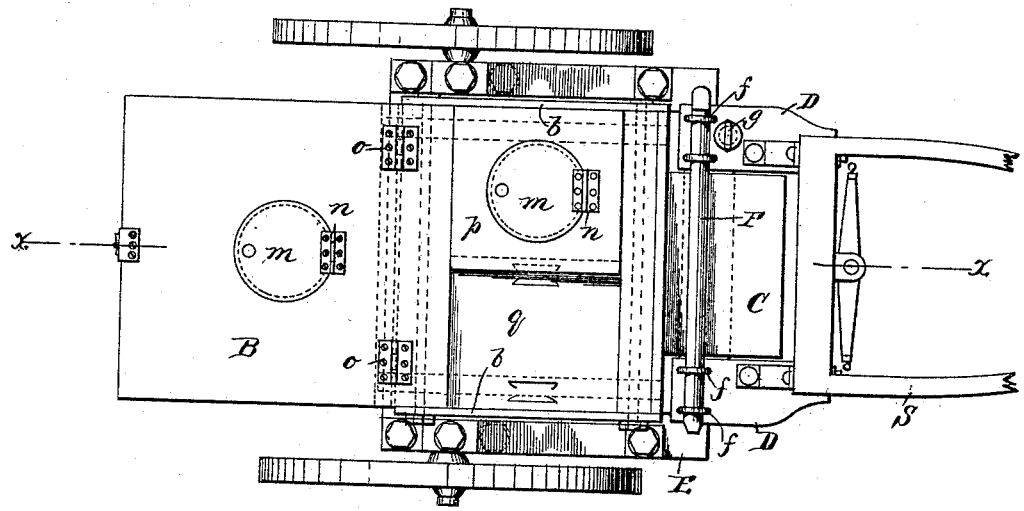
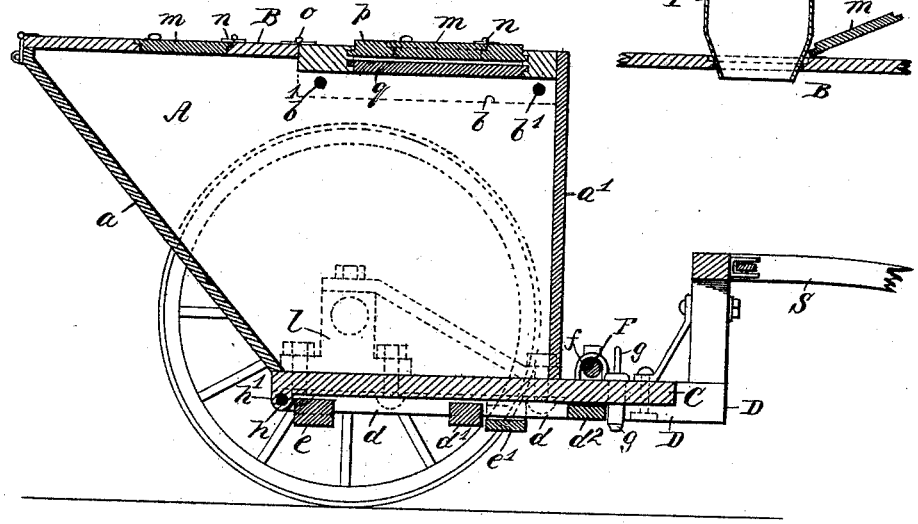

UNITED STATES PATENT OFFICE.

ARTHUR C. BUTTS AND JOHN O'MARRA, OF NEW YORK, N. Y.

CART.

SPECIFICATION forming part of Letters Patent No. 495,722, dated April 18, 1893.

Application filed May 5, 1892. Serial No. 431,866. (No model.)

*To all whom it may concern:*

Be it known that we, ARTHUR C. BUTTS and JOHN O'MARRA, both of New York, in the county and State of New York, have invented a new and useful Improvement in Carts, of which the following is a specification.

Our improvement refers to carts used for collecting ashes and refuse garbage in cities, and relates particularly to dump-carts whose contents are dumped from the end of a wharf or pier into a scow in the water below.

The carts heretofore used in cities for collecting ashes and like refuse are very objectionable from the fact that the carts are without covers or tops and the ashes when dumped into them are very apt to fly out over the street to the annoyance and detriment of all within their reach; and such carts have been made high so it is a difficult matter to fill them and particularly to dump a barrel of ashes or like heavy material over their sides.

When the cart is to be dumped from the end of a pier, with the present construction of cart, it would be impracticable to place the body of the cart very low on account of the difficulty of dumping the cart over the block or string-piece on the end of the wharf or pier. This block or string-piece is usually of considerable height and unless the body of the cart is high enough to clear the string-piece the cart cannot be properly dumped so as to completely discharge its contents.

Our improvement is designed to produce a cart in which the body is hung very low, and which can be readily dumped over the string-piece on the end of the wharf, and moreover, which shall be provided with a cover to inclose the contents of the cart and prevent the escape of the ashes from the barrel, can or other receptacle being emptied into the cart.

In the accompanying drawings illustrating our improvement, Figure 1 is a plan view. Fig. 2 is a longitudinal sectional elevation through the line $x\ x$, Fig. 1. Fig. 3 is a side elevation showing the position of the cart when dumped. Fig. 4 is a plan view of the sliding frame and bed of the cart. Fig. 5 is a detail section showing the manner of filling the cart from a can especially devised for the purpose and Fig. 6 is a modified form of cover shown on a reduced scale.

A is the body of the cart. D is the sliding frame to which the latter is hinged.

E is the bed of the cart on which the sliding frame rests and moves and B is the cover of the cart.

The body A which is preferably constructed in the form shown, and has the cover B and bottom C and the inclined or sloping back or end $a$, is hinged at its rear end to a horizontal frame D so that the body can dump or turn over in the manner shown in Fig. 3. This frame D to which the body A is hinged is formed of the side pieces $d\ d$ and cross pieces $d'\ d^2$ and rests on the bed E of the cart so as to slide or move over the latter and has attached to it at its forward end, the shafts S. The cross piece $d'$ of the frame passes under the bed E, so that while the frame is free to slide back and forth on the latter it cannot be raised from the bed when the body of the cart is dumped back. This cross piece $d'$, furthermore, limits the movement of the frame on the bed, as when the frame is slid back in dumping the cross-piece $d'$ coming in contact with the cross-piece $e$ of the bed arrests the further backward movement of the frame, and when the frame is drawn forward its movement is arrested by the cross piece $d'$ striking the cross piece $e'$ of the bed.

The body of the cart is connected to the frame by the rod $h$ passing through the ends of the side pieces $d\ d$ and through the lug $h'$ on the bottom of the cart, so the body is free to turn or swing entirely over when dumped. When the body of the cart is erect, the bottom C rests on the frame D, the front end of the bottom projecting near the shafts S. The body of the cart is held down and prevented from dumping by the cross-bar F which passes through staples $f\ f$ on the frame D and over the bottom C of the body. To prevent the frame and body of the cart from sliding back, a pin $g$ is inserted through a hole in the frame and in the bed E thus securing the two together. The bed E is hung some distance below the axles, being supported in the construction shown in the drawings by the standards $l\ l$ carrying the axles.

In the operation of dumping the cart, the body is turned over as the frame D is slid back and as the body is secured to the frame at the extreme rear end, it follows that the frame as it slides back is relieved in large part from the weight of the body and its contents, and thus moves with little friction.

The top or cover B of the cart is made removable, being fastened to the cart by the rod $b'$ $b'$ passing through the side pieces $b$ $b$ and through the sides of the cart. The back end of the cover is hinged at $o$ $o$ so that when the body is dumped this end will open and allow the contents of the cart to drop out. In the cover are round openings, closed by the lids $m$ secured by the hinges $n$ through which the cart is filled. We prefer to use with such round openings, the can shown at T, Fig. 5, which has a converging neck or mouth which fits in the opening and thus prevents the contents of the can from escaping as they are dumped into the cart.

In the construction shown in Fig. 1, one of the openings is placed in a sliding section $p$ which is half the width of the cover, and is arranged to slide from one side of the cover to the other, according to the side from which the cart is to be filled. In connection with this section $p$, is another section $q$ arranged to slide below the former section as the latter is moved from one side to the other of the cart and thus keep the cover intact. In the modification shown in Fig. 6, the two openings are placed side by side in the center of the cover and are in a hinged section $r$ which can be opened when the can or other receptacle is too large to dump through the round openings.

In the use of the cart when full and in the condition shown in Fig. 2 for the purposes of dumping, the pin $g$ and cross bar F are pulled out, then the horse is backed up while the wheels rest against some obstruction behind, such as the string-piece, shown at K, Fig. 3. This obstruction holds the bed E stationary and consequently the backing of the horse causes the sliding frame D to slide backward to the position shown in Fig. 3. At the same time, the attendant raises the front of the cart causing it to dump. It will thus be seen, that the pivotal point for the dumping operation is shoved backward to a considerable distance and that the power of the horse is utilized for this purpose.

We claim—

1. In a dump cart in combination, the body, the shafts, the axles, a bed secured to the axles and a sliding frame secured to the body and shaft, whereby the body is slid back by backing the horse substantially as described.

2. In a dump cart in combination, the body, the axles, a bed secured to the axles, a sliding frame mounted upon said bed secured to the shaft, whereby the body is slid back by backing the horse and a pivotal connection between the rear end of said sliding frame and the body, substantially as described.

3. In a dump cart in combination, the body, the axles, hangers depending upon the axles, a bed secured to said hangers, a sliding frame upon said bed secured to the shaft, whereby the body is slid back by backing the horse, and a pivotal connection between the body and said sliding frame, substantially as described.

4. In an ash-cart in combination the body, having a cover provided with an opening to receive the load and with a hinged lid extending to the rear of the cart and adapted to open when the cart is dumped, the axles, hangers depending upon the axles, a bed secured to said hangers, a sliding frame upon said bed secured to the shaft and a pivotal connection between the body and said sliding frame whereby the body is slid back and dumped when the horse is backed, substantially as described.

ARTHUR C. BUTTS.
JOHN O'MARRA.

Witnesses:
  FRED L. KEMPER,
  J. E. GREER.